May 22, 1956

E. L. CLINE 2,746,289

ENGINE PERFORMANCE INDICATING MEANS FOR USE WITH
CHASSIS DYNAMOMETERS

Filed Sept. 24, 1947

Inventor
*Edwin L. Cline*

By *Bacon + Thomas*

Attorneys

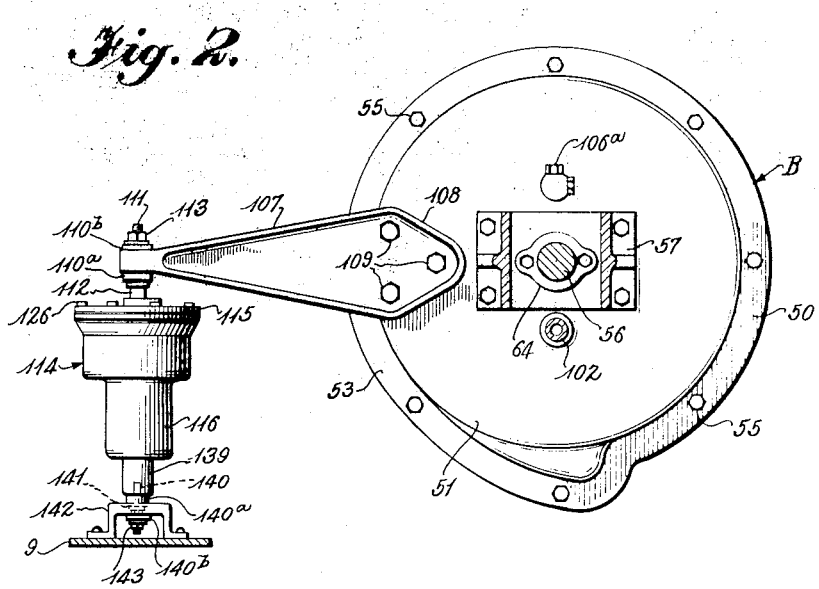
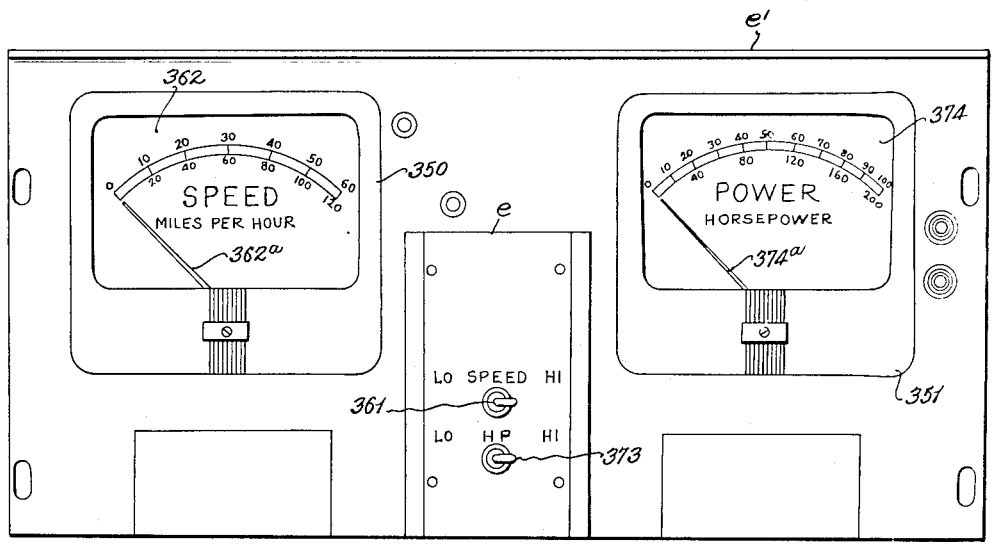

May 22, 1956  E. L. CLINE  2,746,289
ENGINE PERFORMANCE INDICATING MEANS FOR USE WITH
CHASSIS DYNAMOMETERS
Filed Sept. 24, 1947  6 Sheets-Sheet 3

Inventor
*Edwin L. Cline*
By *Bacon + Thomas*
Attorneys

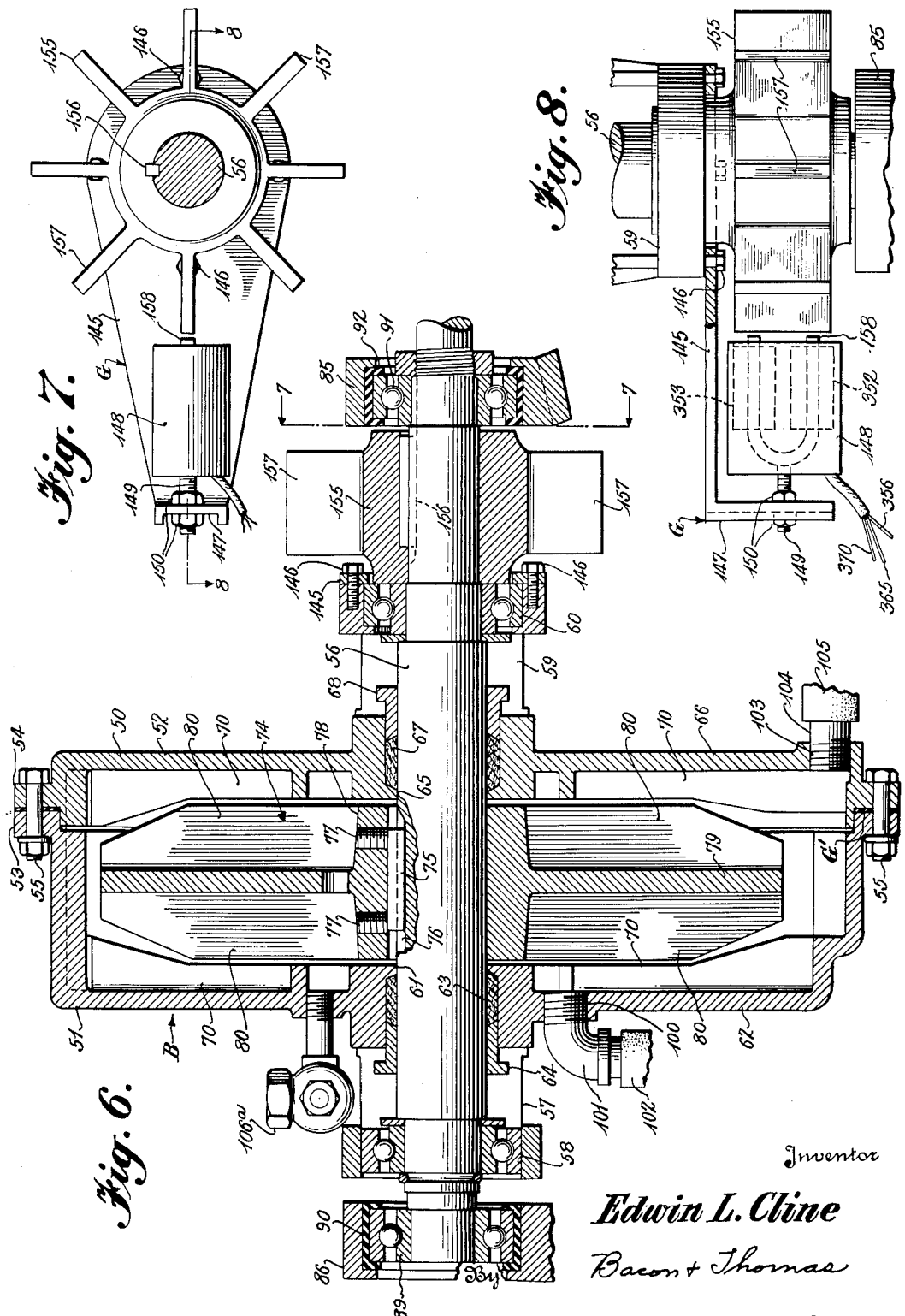

Fig. 9.

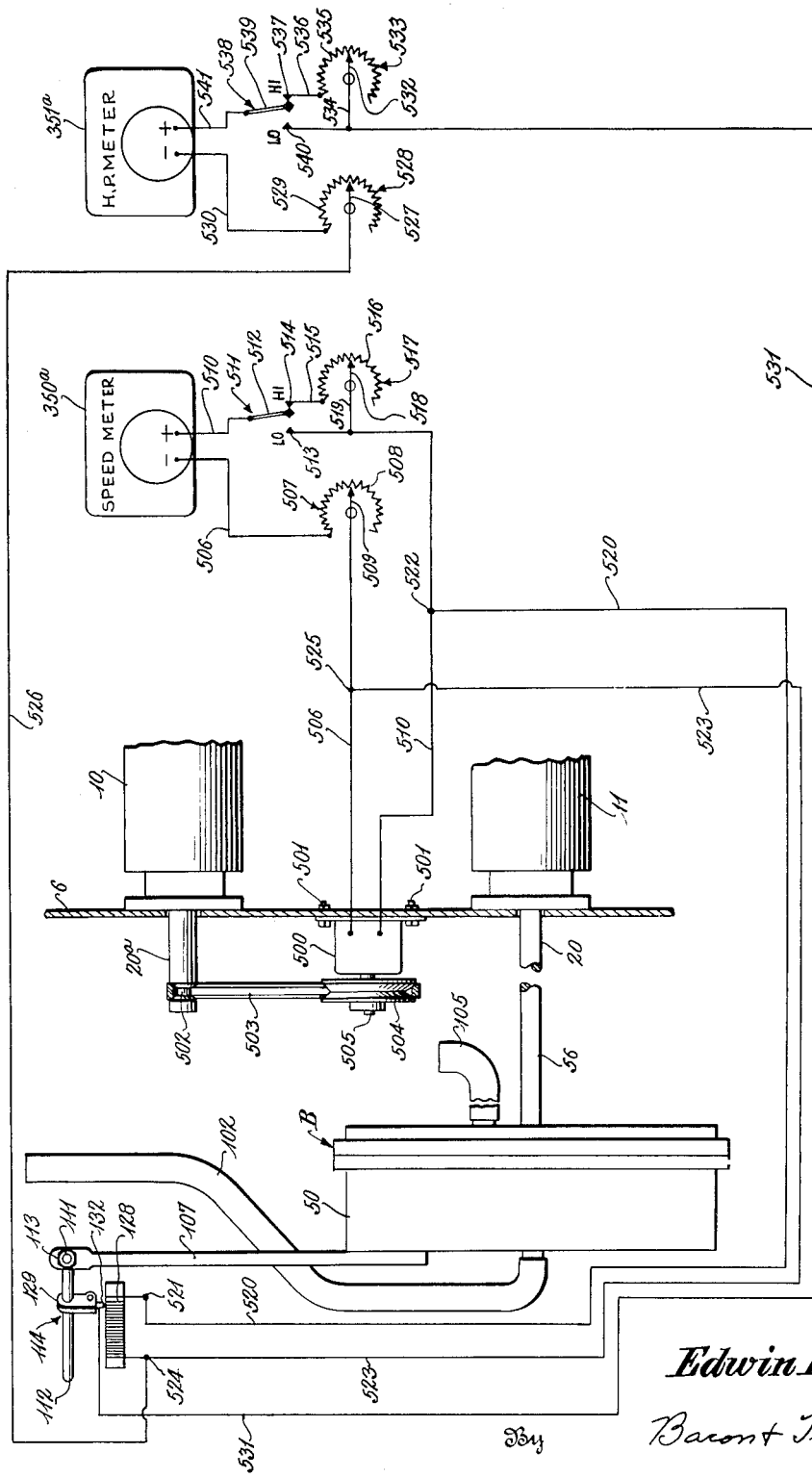

United States Patent Office 2,746,289
Patented May 22, 1956

2,746,289

ENGINE PERFORMANCE INDICATING MEANS FOR USE WITH CHASSIS DYNAMOMETERS

Edwin L. Cline, Pasadena, Calif., assignor to Clayton Manufacturing Company, El Monte, Calif., a corporation of California Application September 24, 1947, Serial No. 775,765

20 Claims. (Cl. 73—117)

The present invention relates to engine testing equipment, and more particularly to apparatus for indicating the speed and horsepower developed by a dynamometer, for example, of the character disclosed in my copending application Serial No. 443,833, filed May 20, 1942, now Patent No. 2,452,550, and of which the instant application is a continuation-in-part.

The principal object of the invention is to provide testing equipment for use with a dynamometer, including instruments that can be readily understood by a layman or car owner, that is to say, instruments affording a direct reading of the horespower developed by the engine while undergoing test and the corresponding speed in miles per hour at which the vehicle would be travelling if it were being run over a road.

Another object of the invention is to provide a torque bridge device adapted to be actuated by angular movement of the housing of a dynamometer, in association with a voltage generator and meter for indicating the torque developed by an engine while undergoing test.

Still another object of the invention is to provide a novel generator construction including a rotor associated with a driven element of a dynamometer, and arranged in a circuit including meters for providing direct readings of the speed and horsepower, respectively, being developed by the engine while undergoing test.

Other objects of the invention will be apparent from the following description taken in conjunction with the accompanying drawings, in which:

Fig. 2 is a view partly in section illustrating the manner in which the housing or stator of the hydraulic brake unit is operatively connected by means of a torque arm to the torque bridge mechanism;

Fig. 3 is an elevational view of a panel provided with instruments and switches suitable for mounting upon a stand;

Fig. 6 is an enlarged sectional view through the hydraulic brake unit taken on the line 6—6 of Fig. 1;

Fig. 7 is a sectional view taken on the line 7—7 of Fig. 6 illustrating a dual voltage generator for producing the voltage to actuate the speed and horsepower indicating meters, respectively, on the instrument panel;

Fig. 8 is a view of voltage generator, partly in section, taken on the line 8—8 of Fig. 7;

Figure 9:
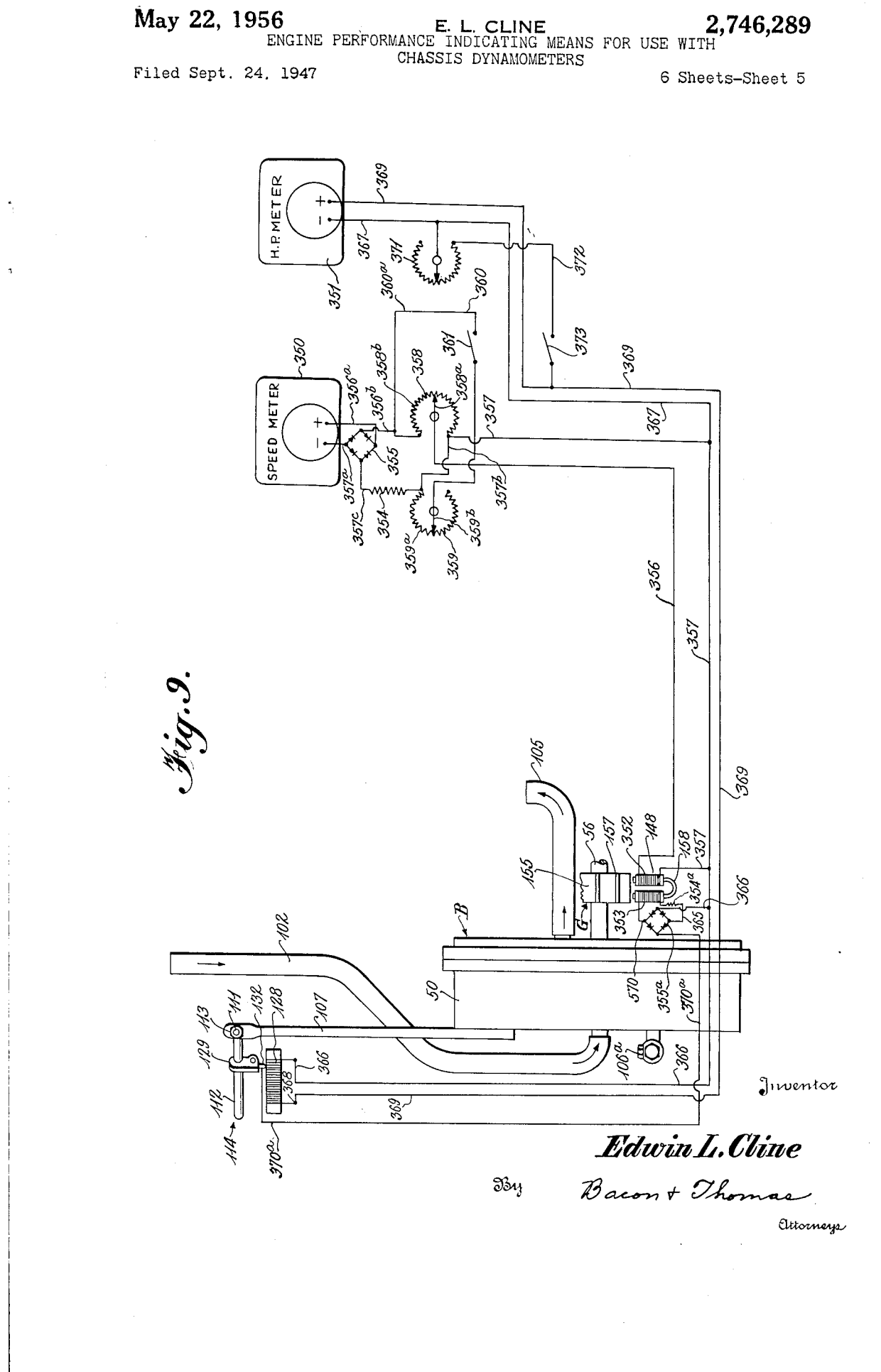

Fig. 9 diagrammatically illustrates a circuit including the torque bridge device, the voltage generator and the speed and horsepower indicating meters; and Fig. 10 diagrammatically illustrates a simplified form of speed and horsepower circuit including a different type of voltage generator from that shown in Fig. 9.

Figure 1:
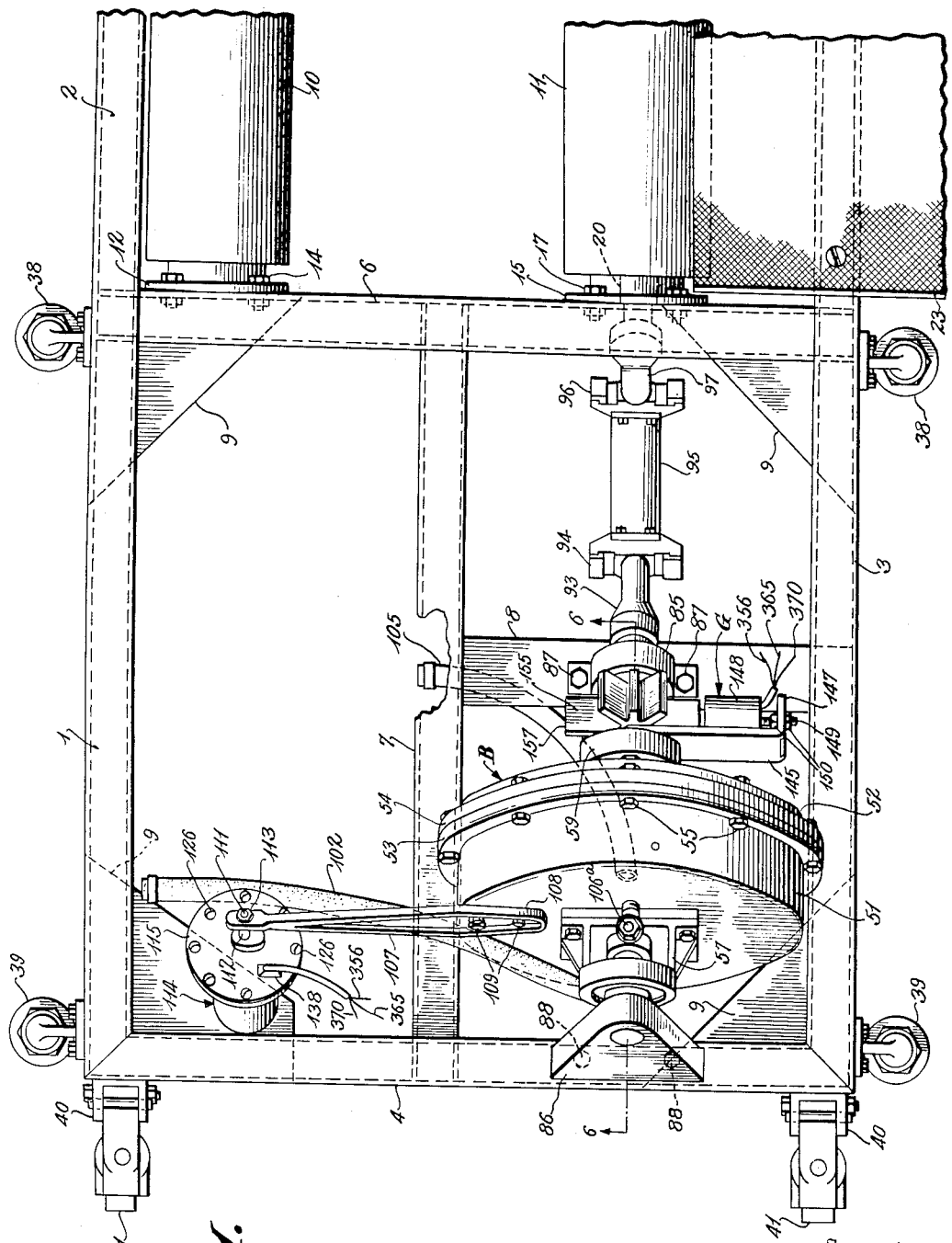
Fig. 1 is a fragmentary plan view of the brake end of a chassis dynamometer having the novel torque bridge and generator comprising the present invention associated therewith.

Referring now to Fig. 1, the frame of the chassis dynamometer is generally identified by the numeral 1. Only the brake end of the frame 1 is shown in this figure, and, as illustrated, comprises longitudinally extending side members 2 and 3 spaced apart and interconnected by transverse members 4 and 6. The transverse members 4 and 6 are connected by a longitudinaly extending section 7, and the section 7 is connected to the side member 3 by a transverse member 8. The frame 1 is stiffened by gusset plates 9. A pair of dynamometer rolls 10 and 11 is mounted horizontally within the frame 1. One end of the roll 10 is supported by a bearing block 12 fastened to the transverse member 6 by bolts 14 and one end of the roll 11 is supported in the bearing block 15 secured to the transverse member 6 by bolts 17. The roll 11 serves as a driver or power takeoff for transmitting the power of the rear wheels of a motor vehicle to the brake unit B of the dynamometer. A pair of ramps 23, only one of which is shown, is provided to enable a vehicle to be backed onto the rolls 10 and 11.

The frame 1 is provided with supporting feet 38 mounted at each end of the rolls 10 and 11 comprising floor-engaging rubber pads (not shown), and with metal feet 39 at the brake end of the frame adapted to engage a floor and serve as stabilizing feet. The frame 1 has a bracket 40 mounted at each corner thereof and each bracket carries a retractable and detachable caster 41. The casters 41 when in advanced position enable the frame 1 to be readily moved from one location to another, and when retracted or removed lower the feet 38, 39 into contact with the floor. The feet 38, 39 and the caster construction 40, 41 are fully disclosed, and claimed in my copending application Serial No. 775,767, filed of even date herewith, now Patent No. 2,707,877.

The construction of the brake or power absorption unit B of the dynamometer is best shown in Fig. 6. This unit includes a drum-like stator casing or housing 50 consisting of two sections 51 and 52 having annular portions terminating in radially extending flanges 53 and 54, respectively, suitably apertured to receive bolts 55, which hold the sections together. A suitable gasket material G' is applied to the confronting faces of said flanges to form a seal. A brake shaft 56 extends through the housing sections 51 and 52. The section 51 carries a bracket 57 in which is mounted a ball bearing 58 providing a support for one end of the shaft 56 and the section 52 carries a somewhat similar bracket 59 in which is mounted a ball bearing 60 forming a support for the opposite end of said shaft. The shaft 56 extends through an opening 61 (Fig. 6) in the side wall 62 of the section 51 and is surrounded by packing 63 held in place by a packing gland 64. The shaft 56 also extends through an opening 65 in the side wall 66 of the casing 52 and is surrounded by packing 67 held in place by a packing gland 68. Thus, the shaft 56 is packed in each of the housing sections 51 and 52 so that no fluid can escape from the housing 50 along said shaft.

Each of the housing sections 51 and 52 is provided with integral vanes 70. A dynamically balanced power absorption rotor or brake wheel 74 is disposed in the housing 50 between the sections 51 and 52 and is secured to the shaft 56 by a key 75 received in a keyway 76 cut in said shaft. Set screws 77 extend through a hub portion 78 of the rotor 74 and retain said rotor in a central position on the shaft 56.

The rotor 74 has a central circular web 79 extending radially from the hub 78 to a point adjacent the inner peripheral surface of the housing 50. Upon each side of the central web 79 is disposed a series of radially extending substantially equally spaced vanes 80 which project from the hub 78 to the periphery of the rotor. The housing and rotor vanes cooperate to form a "working circuit" for the brake liquid, as is well understood. The arrangement and details of construction of the vanes of the brake unit are more fully described, and claimed, in my copending application Serial No. 443,833, now Patent No. 2,452,550, supra, of which the instant application is a continuation-in-part.

The brake unit B is mounted upon the frame 1 by bearing brackets 85 and 86 (Fig. 1), the bearing bracket 85 being secured to the short transverse frame member 8 by bolts 87 and the bearing bracket 86 being secured to the transverse end member 4 by bolts 88. The bearing brackets 85 and 86 support the brake unit B with the axis of the shaft 56 disposed upon an angle relative to the axis of the drive roll 11. The disposition of the shaft 56 upon an angle makes it possible to provide a chassis dynamometer which does not require a deep pit, or the raising of the dynamometer frame and rolls to a substantial height above the level of the floor. As is shown in Fig. 6, the outer end of the shaft 56 carries a ball bearing 89 which is mounted in a rubber grommet or noise insulator 90 in the bearing bracket 86. The opposite end of the shaft 56 is similarly mounted in a ball bearing 91 and rubber grommet 92 in the bearing bracket 85.

The brake shaft 56 carries one element 93 (Fig. 1) of a universal joint at its lowermost end and this element is connected to a cooperating element 94 carried by one end of an intermediate shaft 95. The opposite end of said intermediate shaft also carries one element 96 of a universal joint, which is operatively connected to another universal joint element 97 secured to an extension 20 of the dynamometer drive roll 11. Thus, it will be apparent that rotary motion imparted to the roll 11 by the driven wheels of a vehicle will be transmitted to the brake rotor 74 through the intermediate shaft 95 and the brake shaft 56.

The housing wall 62 has a threaded opening 100 in which one end of a service elbow 101 is mounted. One end of a brake liquid return hose 102 is connected with the elbow 101 and its opposite end is connected with a heat exchanger (not shown) for cooling the brake liquid. The housing wall 66 has a threaded opening 103 in which one end of a nipple 104 is mounted and an outlet hose 105 is connected with said nipple and with the aforementioned heat exchanger. The hose sections 102 and 105 interconnect the brake unit B and the heat exchanger in a manner to provide a "closed" circulating system for cooling the brake liquid, as fully disclosed, and claimed, in my parent application, Serial No. 443,833, supra. An air inlet check valve 106ª prevents the creation of a vacuum condition in the housing 50 upon the withdrawal of brake liquid therefrom.

Figure 4:
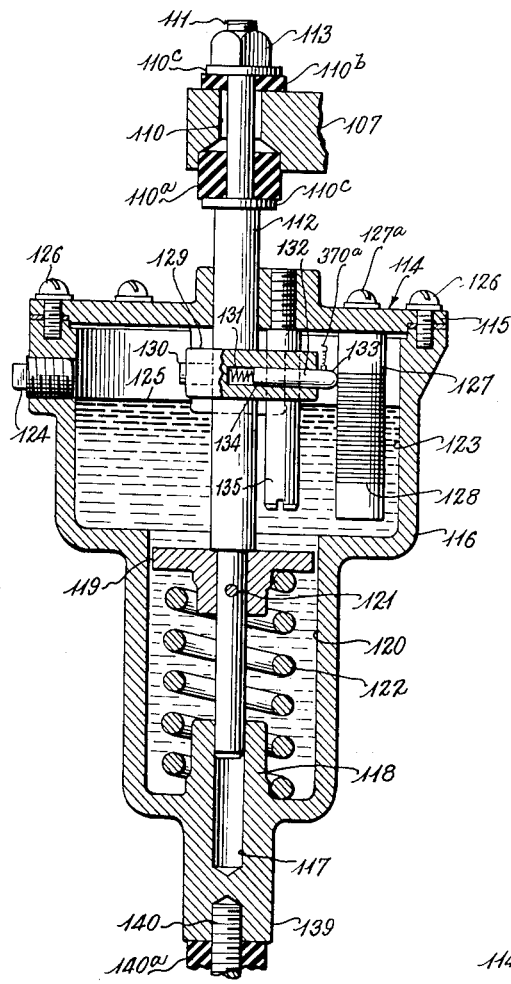
Fig. 4 is an enlarged vertical sectional view through the torque bridge mechanism connected with the free end of the torque arm carried by the brake housing.
Figure 5:
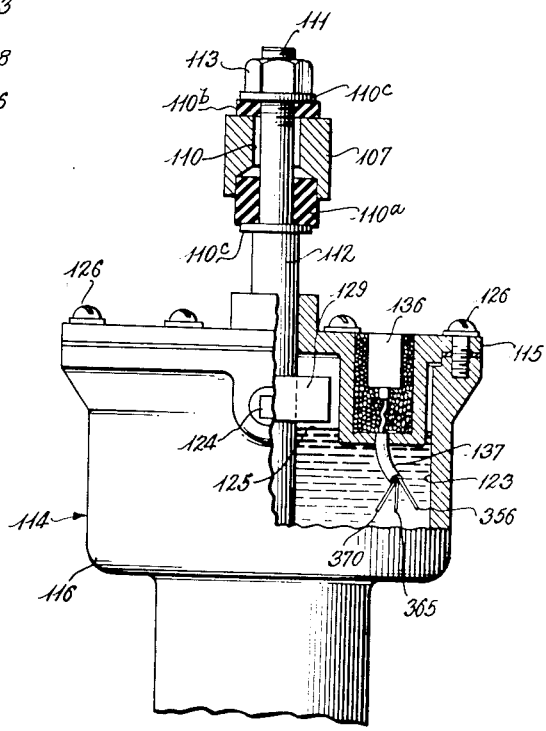
Fig. 5 is a view partly in section of the torque bridge shown in Fig. 4, but illustrating in particular a socket adapted to receive a plug for connecting the torque bridge mechanism with the generator coils.

The housing section 51 carries a torque arm 107 (Figs. 1 and 2). One end 108 of the torque arm 107 is secured to said housing section by bolts 109 and the opposite end of said torque arm is provided with a hole 110 (Fig. 4) adapted to loosely receive a shouldered and threaded end 111 of a rod 112. The hole 110 is enlarged to receive a rubber shock washer 110ª. A second rubber shock washer 110ᵇ is received on the rod 112 and the assembly is secured together by a self-locking nut 113, suitable washers 110ᶜ being associated with the shock washers. The purpose of the shock washers 110ª and 110ᵇ is to provide a more or less flexible connection to permit slight pivotal movement of the torque arm with respect to said rod to prevent binding as the housing or stator 50 turns under load. The rod 112 is part of a torque bridge device 114 for, in effect, "weighing" the torque produced by the engine undergoing test. The torque bridge device 114 includes a cover 115 and a housing 116. The rod 112 extends through the cover 115 into the housing 116, and the lower end of said rod is slidably received in a bore 117 formed in a boss 118 projecting upwardly in said housing. The rod 112 has a piston 119 mounted thereon which is adapted to reciprocate in a cylinder bore portion 120 within the housing 116. The piston 119 may be secured to the rod 112 by a pin 121 or other suitable means. A calibrated load spring 122 surrounds the boss 118 and is interposed between the piston 119 and the lower end wall of the cylinder bore 120. The spring 122 is thus arranged so that it resists downward movement of the rod 112 and thereby opposes turning of the torque arm 107 and the brake housing or stator 50 of the hydraulic brake unit B. However, the spring 122 is adapted to yield in proportion to the torque developed and to allow corresponding downward movement of the rod 112.

The torque bridge housing 116 has an enlarged portion 123 above the cylindrical portion 120 and a filling plug 124 is mounted in the side wall of said enlarged portion. The housing 116 is preferably filled with light oil 125 to a level corresponding to that of the opening of the plug 124. The oil, of course, also fills the cylinder portion 120 and the piston 119 is fitted in said cylinder portion with a slight clearance so that the oil in cooperation with said piston provides a dash pot effect which prevents fluctuations in the vertical movement of the rod 112.

The torque bridge housing 116 is closed at its upper end by the cover plate 115 which is sealed against leakage and held in place by a suitable number of screws 126. An element 127 is secured to the cover 115 by a screw 127ª and has a resistance or potentiometer coil 128 wound thereon. The rod 112 carries an arm 129 secured thereto by a set screw 130. The arm 129 has a bore containing a compression spring 131 and a contact finger 132 which is adapted to be urged outwardly by said spring. The outer end of the contact finger 132 is rounded, as indicated at 133, and normally engages the potentiometer coil 128. The arm 129 has a hole 134 which slidably engages a guide pin 135 mounted on the underside of the cover 115 for keeping the finger 132 aligned with the coil 128. The coil 128 is arranged in a circuit, which will be described later, to give a direct meter reading of the horsepower developed by the engine undergoing test, the readings being dependent upon the amount of vertical movement of the rod 112, which changes the position of the finger 132 with respect to the potentiometer coil 128 so as to vary the amount of current that will flow through said coil to the meter. The cover plate 115 also carries a socket 136 from which extends a cable 137 containing the necessary lead wires for connection with the coil 128 and contact finger 132. The socket 136 is adapted to receive a plug 138 (Fig. 1) for electrically connecting the torque bridge 114 with a generator G to be described later.

The torque bridge housing 116 carries a dependent boss 139 (Fig. 2) which has a stud 140 mounted therein. The stud 140 projects through an opening 141 in a bracket 142 suitably mounted upon a gusset plate 9 of the frame 1. Shock washers 140ª and 140ᵇ, similar to the washers 110ª and 110ᵇ, are mounted upon the stud 140 on opposite sides of the bracket 142 and a self-locking nut 143 is threaded upon the stud 140 and pivotally secures the housing 116 to the bracket 142.

The bracket 59 on the housing section 52 carries a laterally extending arm 145 (Figs. 1, 7 and 8), the inner end of which is secured to said bracket by bolts 146. The opposite end of the arm 145 terminates in a portion 147 which extends at right angles to the direction of said arm. The portion 147 carries a generator stator coil assembly 148 mounted upon a stem 149 which projects through the portion 147 and is adjustably held in place by nuts 150 disposed upon opposite sides of said portion 147. A cooperating generator rotor 155 is secured to the brake shaft 56 by a key 156 so that the rotor must turn at the same speed as said shaft. The rotor 155 is provided with eight arms 157 which successively pass the ends of a permanent horseshoe magnet 158. The rotor 155, in cooperation with the coil assembly 148, acts as a generator to a generate voltage in proportion to the speed of the brake shaft 56. The generator coil assembly 148 is connected in circuit with the potentiometer coil 128 and to suitable meters, which will be described later, for giving a direct reading of the speed and horsepower, respectively, that would be developed by the vehicle under test, if it were operating on the road.

An instrument panel e' (Fig. 3), which can be mounted upon a stand (not shown) carries a direct reading speed meter 350 graduated to indicate miles per hour and a direct reading power meter 351 graduated to indicate horsepower. The operation of these meters is very simple and quite accurate, as will be explained more fully hereinafter.

The direct reading speed and horsepower meters are preferable to meters which indicate speed in revolutions per minute and torque in pounds for the reasons that: first, the average motorist or layman will more readily understand the performance of the vehicle being tested when measured in terms of speed in miles per hours and horsepower; and, secondly, horsepower is the product of both speed and torque and, therefore, slight changes in the vehicle performance influence both the speed and torque with the result that if the effect of these changes is recorded on one meter (the horsepower meter), the dynamometer will actually indicate smaller changes in vehicle performance than it could with indications of revolutions per minute and torque in pounds, respectively.

One wiring arrangement for the speed meter (miles per hour) and horsepower meter is diagrammatically illustrated in Fig. 9. The speed meter is indicated at 350 and the horsepower meter at 351. These meters are preferably voltmeters of one milliampere rating.

It will be recalled that the voltage for actuating the speed and horsepower meters 350 and 351 is generated by the generator G consisting of the rotor 155 and the stator coil assembly 148. In engine testing practice, the brake horsepower developed can be calculated from a definite formula of the speed in revolutions per minute multiplied by $2\pi$ torque and divided by a constant (33,000). Inasmuch as the speed of the generator rotor 155 is the same as the speed of the brake shaft 56, the voltage generated will be proportional to the mechanical horsepower being developed under any given torque load. The same is true of the speed of the shaft 56 and the speed in miles per hours that the vehicle would make on the open road. Accordingly, the speed meter 350 and the horsepower meter 351 are calibrated to indicate the vehicle's performance directly in terms of miles per hours and horsepower, respectively.

The generator G is of the double induction type and the coil assembly 148 includes a permanent horseshoe magnet 158 (Figs. 8 and 9) and coils 352 and 353, one on each pole of the magnet. The voltage for the speed meter 350 is generated through the coil 352 and the voltage for operating the horsepower meter 351 is simultaneously generated through the second coil 353.

Inasmuch as the generator G causes the magnetic field formed by the permanent horseshoe magnet 158 and the two coils 352 and 353 to be repeatedly built up and collapsed by the rotation of the paddle-like arms 157, the magnetic field strength fluctuates and an alternating current of high voltage, directly proportional to the revolutions of the generator rotor 155, is generated in said coils. Before this current can be used to actuate the speed meter 350 and the horsepower meter 351, it must be reduced and rectified to direct current. This is done by using a high resistance coil 354 or 354a in series with a conventional copper oxide rectifier 355 or 355a, one coil and one rectifier being associated in a circuit with each meter, as explained later. As is well known, rectifiers of the type mentioned change their internal resistance with changes in current and temperature. The generator G is designed to generate a high voltage current, but in view of the high resistances, changes in the rectifier resistance become negligible insofar as the entire resistance change of the circuit is concerned. The use of the high resistances in the circuits, therefore, increases the accuracy of the readings obtained with the meters 350 and 351.

The use of the two generator coils 352 and 353 necessarily requires the use of two circuits. The speed circuit is quite simple because of the fact that the voltage generated by the coil 352 is directly proportional to the speed, thereby enabling the speed meter 350 to be suitably connected across the coil 352 through the rectifier 355. This is done by the lines 356 and 357 and 356a and 357a. The line 356 is connected at one end to one side of the coil 352 and its opposite end is connected with the movable arm 358a of a potentiometer 358. One end of a resistance element 358b of said potentiometer is connected by a lead 356b to one terminal of the rectifier 355, the line 356a connecting an adjacent terminal of said rectifier with the positive terminal of the speed meter 350. One end of the line 357 is connected with the other end of the coil 352 and the other end of said line is connected with the other end of the resistance element 358b of the potentiometer 358, said other end of the line 357 being connected by a lead 357b with one terminal of a resistance element 359a of a second rheostat 359. A second lead 357c includes the resistance 354 therein and connects one end of the resistance element 359a with one terminal of the rectifier 355 and the line 357a connects an adjacent terminal of said rectifier with the negative terminal of the speed meter 350.

The rheostat 359 is placed across the lines 356 and 357 as a shunt, the shunt circuit being generally indicated at 360 and including a line 360a, one end of which is connected with the lead 356b and the opposite end of which is connected with the movable arm 359b of the rheostat 359. A toggle switch 361 is connected in the line 360a at a point between the lead 356b and the arm 359b. This switch is marked "Speed" on the switch panel e (Fig. 3). The closing of the switch 361 reduces the current reaching the meter 350 so that wide speed ranges can be recorded on relatively short meter scale lengths without impairing the ease of such reading through the normal and most commonly used speed ranges. As is indicated in Fig. 3, the speedometer 350 includes an indicator arm 362a that moves across a dial 362 calibrated to indicate two ranges, namely, speeds of 0 to 60 miles per hour and speeds of 0 to 120 miles per hour, the latter scale being rendered effective when the shunt switch 361 is manually closed. The letters "LO" and "HI" are also associated with the switch 361 to indicate which scale is to be read. If desired, additional rheostats and shunts (not shown) can be used to further reduce the sensitivity of the meter.

While the speed meter 350 has been calibrated to read in miles per hour, it could equally well be calibrated to give readings in revolutions per minute, or to give both, as will be readily apparent inasmuch as the speed in miles per hour is directly proportional to the number of revolutions of the rolls 10 and 11 and the brake shaft 56.

It will be understood that after the potentiometer 358 has been adjusted to the proper position for calibrating the speed meter 350 in miles per hour, it is sealed so that the reading for any given speed will always be constant.

As has also been explained, the torque bridge 114 in effect "weighs" the torque developed by the hydraulic brake unit B so that if it should be desired to obtain a torque indication on an electrical meter, a constant potential could be sent across the potentiometer coil 128 and a reading taken directly from a torque meter. It is obvious, on the other hand, that if a voltage directly proportional to the speed of the brake shaft 56 of the brake unit B is sent across the resistance coil 128 of the potentiometer, instead of a constant potential, the resulting voltage for actuating the meter will be directly proportional to the product of the speed and torque which can be conveniently recorded as horsepower on a properly calibrated meter. The horsepower meter 351 is such a meter. The voltage for actuating the horsepower meter 351 is generated through the coil 353. A lead 365 is in series with the resistance 354ª and is connected to one side of the rectifier 355ª. The rectifier is connected by a line 366 to one end of the potentiometer coil 128 and is also connected to the horsepower meter through the line 357 and a line 367 connected thereto going to the negative side of the horsepower meter 351. The opposite end of the coil 128 is connected at 368 to a line 369 that runs to the positive side of the horsepower meter 351. The other side of the coil 353 is connected by a lead 370 to the other side of the rectifier 355ª and a line 370ª extends from said rectifier to the movable contact finger 132 associated with the potentiometer coil 128. The resistance 354ª and the rectifier 355ª are thus connected across the horsepower coil 353 and are so arranged in the circuit that low voltage direct current is supplied to the potentiometer coil 128 and the horsepower meter 351, respectively.

The circuit for indicating the horsepower is calibrated by varying the width of the air gap between the end of the generator rotor arms 157 and the ends of the horseshoe magnet 158 carrying the coils 352 and 353.

The capacity of the horsepower meter 351 may be varied in a manner similar to that explained in connection with the speed meter 350 by using a rheostat 371 shunted across the lines 367 and 369 by a shunt line 372 including a manually operable toggle shunt switch 373 marked "H. P." on the switch panel *e* (Fig. 3). The horsepower meter 351 includes an indicator arm 374ª and a dial 374 (Fig. 3) provided with two scales, one reading 0 to 100 and the other 0 to 200, thus adapting the single meter to test engines of various size. The letters "LO" and "HI" are also associated with the switch to indicate which scale is to be read.

The dials 362 and 374 of the meters 350 and 351 can be illuminated by indirect lighting means (not shown), if desired.

Fig. 10 diagrammatically illustrates a greatly simplified form of speed and horsepower circuits including a direct current voltage generator 500, which may be conveniently mounted within the C-shaped transverse frame member 6 by means of mounting bolts 501. The generator 500 is located on the frame member 6 at a point between the dynamometer rolls 10 and 11 and is preferably driven from the idle roll 10. In order to accomplish this, an extension 20ª of the roll 10 is provided with a groove 502 adapted to receive a V-belt 503. The belt 503 passes over a V-pulley 504 mounted upon the rotor shaft 505 to the generator 500. Obviously, the belt 503 will drive the generator shaft 505 at a speed directly proportional to that of the speed of the roll 10.

A speed meter 350ª (identical in all respects to the speed meter 350) is connected across the generator 500. Thus, a line or conductor 506 interconnects one side of the generator 500 with one side of the speed meter 350ª. A rheostat 507 is connected in series in the line 506 and includes a resistance coil 508 and an adjustable arm 509. The rheostat 507 enables accurate calibration of the speed meter 350ª, the calibration of said meter being effected in the same manner described in connection with the calibration of the speed meter 350. A second line or conductor 510 connects the other side of the speed meter 350ª with the other side of the generator 500. A double throw switch 511 is connected in the line 510 and includes an arm 512 arranged to engage either a contact 513 interposed in the line 510, or to engage a contact 514 connected by a lead 515 with one end of a resistance coil 516 of a second rheostat 517. The rheostat 517 includes an adjustable arm 518 connected by a lead 519 with the line 510.

It will be apparent that the rheostat 507 and 517 are connected in series with the lines or conductors 506 and 510, instead of being connected in parallel with the speed meter, as in the previously described circuit. Also, it will be understood that the speed meter 350ª includes a dial (not shown) identical to the dial 362 and provided with high and low reading scales for indicating speed in miles per hour. Accordingly, when the switch arm 512 is engaged with the "HI" contact 514, the flow of current through the horsepower meter 350ª is resisted by the rheostat 517, thereby causing the indicator arm (not shown) of the speed meter 350ª to move an appropriate distance for indicating a reading on the high speed scale. It will also be apparent that when the switch arm 512 is moved to a position such that it engages the "LO" contact 513, the rheostat 517 will be completely cut out of the circuit and the needle or indicator arm of the meter 350ª will then move in a manner to indicate the correct speed on the low speed scale. The rheostat 507 and 517 are, of course, connected in series in the speed circuit.

In Fig. 10, the potentiometer coil 128 is also connected across the generator 500 by a line or conductor 520 connected at 521 with one end of said potentiometer coil and connected with the conductor 510 at 522, and a line or conductor 523 connected to the other end 524 of the potentiometer coil 128 and with the conductor 506 at 525. The end 524 of the potentiometer coil is connected by a line or conductor 526 with an adjustable arm 527 of a rheostat 528. The rheostat 528 includes a resistance coil 529 which is connected by a lead 530 to one side of a horsepower meter 351ª, which is identical in all respects to the previously described horsepower meter 351, including the high and low horsepower scales shown on the dial 374. The rheostat 528 is employed to accurately calibrate the horsepower meter 351ª, thereby eliminating any adjustment comparable to the adjustment of the horseshoe magnet 158 incident to the calibration of the horsepower meter 351.

The slidable finger or contact 132 of the torque bridge device 114 has a line or conductor 531 connected thereto and this line is also connected with a movable arm 532 of a second rheostat 533 by means of a lead 534. The rheostat 533 includes a resistance coil 535 which is connected by a lead 536 to a "HI" contact 537. A switch 538 similar to the switch 511 includes an arm 539 arranged to be engaged with either the "HI" contact 537 or a "LO" contact 540 interposed in the line 531. The switch arm 539 is connected by a lead 541 to the other side of the horsepower meter 351ª.

The operation of the switch 538 is similar to that of the switch 511, namely, when the switch arm 539 is engaged with the "HI" contact 537, the indicator arm (not shown) of the horsepower meter 351ª is to be read with respect to the high scale on the meter, whereas when said switch arm is engaged with the "LO" contact 540, the reading is to be taken from the low scale. When the switch arm 539 is in the latter position, the rheostat 533 is, of course, completely cut out of the circuit. It will also be observed that the rheostats 528 and 533 are connected in series in the horsepower circuit.

It will be readily understood that the slidable or movable contact 132 will be moved along the potentiometer coil 128 by the arm 107 in accordance with the angle of rotation of the housing 50 of the brake unit B, and that the extent of rotation will depend upon the torque being developed by the engine of the vehicle undergoing test. Consequently, the movement of the contact 132 along the coil 128 will be directly proportional to the torque developed. On the other hand, the direct current voltage produced by the generator 500 will be directly proportional to the speed of the roll 10, so that a direct reading of the speed that would be developed by the vehicle if it were operated on the road can be obtained from the speed meter 350ª. Likewise, the horsepower meter 351ª will indicate the true horsepower being developed inasmuch as the reading thereon will be determined by two variables, namely, the position of the contact 132 of the potentiometer, which is determined by the torque being developed, and the voltage output of the generator which is determined by the speed at which it is driven.

While Fig. 10 represents a simplified arrangement of circuits, it is also obviously conducive to greater accuracy in results for the reason that there is less tire-to-roll slippage between the wheels and the roll 10, which drives the generator 500, than between the wheels and the roll 11 connected with the power absorption device 50. Hence, the roll 10 will be driven at a relative speed more closely conforming to the speed of the engine than the roll 11 which imposes a load through its frictional engagement with the tires of the driven wheels.

It will be apparent from the foregoing that the present dynamometer apparatus includes relatively simple and inexpensive engine performance testing and indicating means, comprising relatively simple and inexpensive equipment for furnishing direct and accurate readings of the speed and horsepower developed, respectively, and which readings can be conveniently used as a basis for comparative tests of the engine with different grades of fuel, etc., and at various desired speeds so that a direct check can be made against the horsepower developed at certain given speeds with different kinds of fuel, etc.

It will be further apparent that various changes may be made in the details of construction and in the arrangement of the various parts of the apparatus disclosed herein without departing from the principles of the invention or the scope of the annexed claims.

I claim:

1. In a dynamometer, a brake for absorbing the power delivered by an engine undergoing test, said brake including a rotor and a stator; a torque arm connected at one end to said stator; and torque absorption means operatively associated with the opposite end of said torque arm, said torque absorption means including a housing, a reciprocable rod in said housing connected at one end with said torque arm, dash pot means in said housing effective upon the opposite end of said rod, a resistance coil in said housing, a contact finger carried by said reciprocable rod having one end thereof slidably engaging said resistance coil; a current source; and an electrical meter operatively connected in circuit with said current source, resistance coil, and contact finger and arranged in the circuit so that movement of said rod will vary the amount of current that can pass through said resistance coil to said meter in accordance with the extent to which said rod is moved by said torque arm.

2. In combination: a brake for absorbing the power developed by an engine undergoing test, said brake including a rotor and a stator enclosing said rotor and angularly movable in accordance with the torque developed by said engine; a torque arm connected at one end to said stator and being bodily movable therewith; a voltage generator; means for driving said generator at a speed directly proportional to that of the engine; torque absorption means operatively associated with the opposite end of said torque arm, said torque absorption means including a housing, a reciprocable rod in said housing connected at one end with said torque arm, dash pot means in said housing effective upon the opposite end of said rod to dampen the movement thereof, a potentiometer coil in said housing, and a contact finger carried by said reciprocable rod having one end thereof slidably engaging said potentiometer coil; and an electrical meter operatively connected in circuit with said generator, contact finger, and potentiometer coil calibrated to indicate the horsepower being developed by said engine in accordance with the extent to which said rod is moved by said torque arm.

3. In a dynamometer, a hydraulic brake for absorbing the power delivered by an engine undergoing test, said hydraulic brake including a rotor and a stator; a torque arm connected at one end to said stator; and torque absorption means operatively associated with the opposite end of said torque arm, said torque absorption means including a housing containing a cylinder bore filled with oil, a reciprocable rod mounted in said housing connected at one end with said torque arm, a piston connected to one end of said rod cooperating with said oil-filled cylinder bore to provide a dash pot action, a calibrated spring between said piston and the bottom of said cylinder bore, a resistance coil in said housing, a contact finger carried by said rod having one end thereof slidably engaging said resistance coil; a current source; and an electrical meter operatively connected in circuit with said current source, resistance coil, and contact finger and arranged in the circuit so that movement of said rod will vary the amount of current that can pass through said resistance coil to said meter in accordance with the extent to which said rod is moved by said torque arm.

4. A torque bridge device, comprising: a housing adapted to have one end thereof secured to a stationary support, a rod reciprocably mounted in the opposite end of said housing and being adapted to be connected at one end to an actuating device; dash pot means in said housing effective upon the opposite end of said rod to cushion the movement thereof; a resistance coil stationarily mounted in said housing; spring means yieldably opposing movement of said reciprocable rod into said housing; a contact finger in said housing carried by said reciprocable rod having one end thereof slidably engaging said resistance coil; and means yieldably urging said contact finger into engagement with said resistance coil.

5. A torque bridge device, comprising: a housing containing a cylinder bore filled with oil; a reciprocable rod having one end slidably received in said housing; a piston connected to said one end of said rod and cooperating with said oil-filled cylinder bore to provide a dash pot action; a calibrated compression spring in said cylinder bore below said piston yieldably opposing movement of said rod into said housing; a potentiometer coil in said housing above said piston; and a contact finger in said housing carried by said rod and slidably engaging said potentiometer coil.

6. In combination: a torque bridge device as defined in claim 5, and means for effecting movement of the rod relative to the potentiometer coil in accordance with the torque developed by an engine undergoing test, and means including a meter connected in a circuit with the torque bridge device for indicating the power developed.

7. A testing apparatus for the engine of a motor vehicle comprising: a frame supporting a pair of rolls adapted to be engaged by the driven wheels of a vehicle; a fluid brake including a brake shaft arranged to be driven by one of said rolls, a housing, and a rotor within said housing secured to said brake shaft, said housing being rotatable on said brake shaft relative to said frame; a generator rotor having a plurality of radial arms mounted upon said brake shaft for rotation with said brake shaft; an arm non-rotatably connected with said housing; a horseshoe permanent magnet carrying a pair of coils mounted upon said arm in close proximity to the periphery of said generator rotor; a torque arm carried by said housing and movable therewith; means operably connected with one end of said torque arm for resisting rotary movement of said housing and including a rod which is moved in proportion to the rotation of said housing; a potentiometer coil; a contact carried by said rod engaging said potentiometer coil for varying the amount of current that can flow through said potentiometer coil; a horsepower meter; a speed meter; and wiring interconnecting said generator coils, potentiometer coil, horsepower meter and speed meter arranged to provide a direct reading of the horsepower and speed developed by the engine being tested.

8. A testing apparatus for the engine of a motor vehicle comprising: a frame supporting a pair of rolls adapted to be engaged by the driven wheels of a vehicle; a brake including a brake shaft arranged to be driven by one of said rolls, a housing, and a rotor within said housing secured to said brake shaft, said housing being rotatable on said brake shaft relative to said frame; an alternating current generator including a rotor having a plurality of radial arms mounted upon said brake shaft for rotation with said brake shaft; a bracket non-rotatably connected with said housing; a horseshoe permanent magnet carrying a pair of coils mounted upon said bracket in close proximity to the periphery of said generator rotor; a torque arm carried by said housing and movable therewith; means operably connected with one end of said torque arm for resisting rotary movement of said housing and including a rod which is moved in proportion to the rotation of said housing; a potentiometer coil; a contact carried by said rod engaging said potentiometer coil for varying the amount of current that can flow through said potentiometer coil; a rectifier for each of said generator coils; a volt meter calibrated to indicate horsepower; a volt meter calibrated to indicate speed; and wiring interconnecting said generator coils, rectifiers, potentiometer coil, horsepower meter and speed meter forming circuits arranged to actuate said meters to provide a direct reading of the horsepower and speed, respectively, developed by the engine being tested.

9. An apparatus for testing the engine of a motor vehicle, comprising: a frame supporting a pair of rolls adapted to be engaged by the driven wheels of a vehicle; a fluid brake including a brake shaft arranged to be driven by one of said rolls, a housing, and a rotor within said housing secured to said brake shaft, said housing being rotatable on said brake shaft relative to said frame; a generator rotor driven at a speed proportional to that of said brake shaft; a generator stator including a generator coil mounted in close proximity to the periphery of said generator rotor; a torque arm carried by said housing and movable therewith; means operably connected with one end of said torque arm for resisting rotary movement of said housing and including a rod which is moved in proportion to the rotation of said housing; a potentiometer coil arranged in a circuit with said generator coil; a contact carried by said rod engaging said potentiometer coil arranged in said circuit for varying the current flowing through said potentiometer coil; and a meter in said circuit having an indicator element actuatable in accordance with the amount of current passing through said potentiometer coil, said meter being calibrated to indicate the performance of the engine undergoing test.

10. A testing apparatus for the engine of a motor vehicle, comprising: a frame supporting a pair of rolls adapted to be engaged by the driven wheels of a vehicle; a hydraulic brake including a brake shaft arranged to be driven by one of said rolls, a stator, and a rotor within said stator secured to said brake shaft, said stator being rotatable on said brake shaft relative to said frame; a generator rotor driven at a speed proportional to that of said brake shaft; a generator stator including a generator coil mounted in close proximity to the periphery of said generator rotor; a torque arm carried by said first-mentioned stator and movable therewith; a torque bridge device; a housing, and a rod slidable in said housing; means pivotally connecting one end of said rod with one end of said torque arm; means pivotally connecting said housing with said frame; means in said housing yieldably opposing movement of said rod; a potentiometer coil arranged in a circuit with said generator coil; a contact carried by said rod engaging said potentiometer coil and connected in said circuit for varying the current flowing through said potentiometer coil; and a meter connected in said circuit having an indicator element actuatable in accordance with the amount of current passing through said potentiometer coil.

11. Engine performance indicating means for a chassis dynamometer, comprising: a pair of rolls adapted to be driven by a wheel of a motor vehicle undergoing test; a voltage generator; means for driving said generator from one of said rolls; a potentiometer coil connected in circuit with said generator; a movable contact engaging said potentiometer coil; a hydraulic power absorption device comprising a rotor driven by the other one of said rolls and a stator yieldably opposing rotation of said rotor and enclosing said rotor and carrying an arm which is rotatable through an angle proportional to the torque developed by the vehicle engine; means connecting said arm with said movable contact; a power meter; and electrical conductors connecting said meter with said movable contact and with one end of said potentiometer coil.

12. Engine performance indicating means for a chassis dynamometer, comprising: a pair of rolls adapted to be driven by a wheel of a motor vehicle undergoing test; a direct current generator driven from one of said rolls; a potentiometer coil connected across said generator; a movable contact engaging said potentiometer coil; a hydraulic power absorption device comprising a rotor driven by the other of said rolls and a rotatable stator enclosing said rotor and carrying an arm rotatable therewith through an angle proportional to the torque developed by the vehicle engine; means connecting said arm with said movable contact; a power meter; and electrical conductors connecting said meter with said movable contact and with one end of said potentiometer coil.

13. Engine performance indicating means for a chassis dynamometer, comprising: a pair of rolls adapted to be driven by a wheel of a motor vehicle undergoing test; a generator including a rotor driven by one of said rolls; a potentiometer coil connected in circuit with said generator; a movable contact engaging said potentiometer coil; a hydraulic power absorption device comprising a rotor driven by the other of said rolls and a rotatable stator enclosing said rotor and carrying an arm which is rotatable therewith through an angle proportional to the torque developed by the vehicle engine; means connecting said arm with said movable contact; a power meter; a first conductor connecting one side of said power meter with said movable contact; a variable resistance connected in series with said first conductor for calibrating said power meter; and a second conductor connecting the other side of said power meter with one end of said potentiometer coil.

14. Performance indicating means for a chassis dynamometer, comprising: a pair of rolls adapted to be driven by a wheel of a motor vehicle undergoing test; a direct current generator driven from one of said rolls; a potentiometer coil connected across said generator; a movable contact engaging said potentiometer coil; a hydraulic power absorption device comprising a rotor driven by the other of said rolls and a rotatable stator enclosing said rotor and carrying an arm which is rotatable therewith through an angle proportional to the torque developed; means connecting said arm with said movable contact; a power meter; a first conductor connecting one side of said power meter with said movable contact; a variable resistance connected in series with said first conductor for calibrating said meter; a second conductor connecting the other side of said power meter with one end of said potentiometer coil; a variable resistance connected in series with said second conductor; and a switch connected with said second conductor between said power meter and said last-mentioned resistance arranged to optionally cut out said second resistance.

15. Performance indicating means for a chassis dynamometer, comprising: a roll adapted to be driven by a wheel of a motor vehicle undergoing test; a direct current generator including a rotor driven by said roll; a speed meter; a conductor connecting one side of said speed meter with one side of said generator; a variable resistance connected in series with said conductor; a second conductor connecting the other side of said speed meter with the other side of said generator; a second variable resistance connected in series with said second conductor; and a switch arranged in circuit with said second conductor arranged to optionally cut out said second resistance.

16. Engine performance indicating means for a chassis dynamometer, comprising: a pair of rolls adapted to be driven by a wheel of a motor vehicle undergoing test;

a voltage generator including a rotor driven by one of said rolls; a potentiometer coil; electrical conductors connecting said potentiometer coil in a circuit with said generator; a slidable contact engaging said potentiometer coil; a hydraulic brake device comprising a rotor connected with one of said rolls and a rotatable stator serving as a housing for and enclosing said rotor; an arm carried by said stator rotatable with said housing through an angle proportional to the torque developed by the engine of the vehicle undergoing test; means connecting said arm with said slidable contact; a power meter having high and low power indicating scales; electrical conductors connecting said power meter with said slidable contact and with one side of said potentiometer coil; and means connected with one of said conductors for selectively rendering said power meter capable of indicating power on either said high or low scale.

17. In a dynamometer, a hydraulic brake for absorbing the power developed by an engine undergoing test, said hydraulic brake including a rotor and a stator; a torque arm connected at one end to said stator; torque absorption means operatively associated with the opposite end of said torque arm, said torque absorption means including an upright housing containing a cylinder bore; a reciprocable rod slidably mounted in the upper end of said housing; resilient means providing a flexible connection between the opposite end of said torque arm and the upper end of said rod; a stationary support; and means flexibly connecting the lower end of said housing with said support; spring means yieldably opposing movement of said reciprocable rod into said housing; a resistance coil stationarily mounted in said housing; and a contact finger carried by said reciprocable rod having one end thereof slidably engaging said resistance coil.

18. Motor vehicle testing apparatus, comprising: a frame; a pair of rolls rotatably supported by said frame and adapted to be simultaneously engaged and rotated by the driven wheels of a vehicle; brake means connected with one of said rolls for opposing rotation thereof by said vehicle wheels; a voltage generator including a rotor driven by the other roll; and a meter connected in a circuit across said generator and having an indicator element actuatable in accordance with the voltage generated by said generator.

19. A torque bridge device, comprising: a housing including a generally cylindrical hollow body portion closed at one end having a removable closure member at its other end, said closure member having an opening formed therein; a rod slidably mounted in said opening and guided by said closure member for reciprocating movement and adapted to be connected at the end thereof disposed exteriorly of said housing to an actuating device; a resistance coil stationarily mounted in said housing with its axis substantially parallel with said rod; means disposed concentric with said rod yieldably opposing movement of said rod into said housing by said actuating device; a contact finger carried by said rod having one end thereof slidably engaging said resistance coil; a plug socket carried by said closure member and conductors extending from said socket to said resistance coil and contact finger.

20. A torque bridge device, comprising: a housing including a generally cylindrical hollow body portion having closure means at both ends thereof, one end of said housing having an opening formed therein; a member slidably guided by and extending through said opening into said housing and actuatable from the exterior of said housing; a piston in said housing connected with said member, said housing containing a body of liquid cooperable with said piston to provide a dashpot action; a resistance coil stationarily mounted in said housing with its axis extending in substantially the same general direction as said member; spring means in said housing yieldably opposing relative axial movement between said member and housing; and a contact element in said housing engaging said resistance coil and disposed in predetermined fixed relation to said member, the closure means at one end of the housing being detachable and said resistance coil being mounted on said detachable closure means.

References Cited in the file of this patent

UNITED STATES PATENTS

| 591,162 | Fiske | Oct. 5, 1897 |
|---|---|---|
| 955,988 | Osburn | Apr. 26, 1910 |
| 977,079 | Dunbar | Nov. 29, 1910 |
| 1,068,132 | Hutchinson | July 22, 1913 |
| 1,228,215 | Junkers | May 29, 1917 |
| 1,266,487 | Van S. Kolff | May 14, 1918 |
| 1,323,240 | Bennett | Dec. 2, 1919 |
| 1,398,792 | Paulin | Nov. 29, 1921 |
| 1,510,440 | Gilman | Sept. 30, 1924 |
| 1,898,728 | Huff | Feb. 21, 1933 |
| 2,130,900 | Presbrey | Sept. 20, 1938 |
| 2,287,796 | Hall | June 30, 1942 |
| 2,297,644 | Angst | Sept. 29, 1942 |
| 2,372,704 | Bennett | Apr. 3, 1945 |
| 2,423,609 | Middleton et al. | July 8, 1947 |

FOREIGN PATENTS

| 390,904 | Great Britain | Apr. 20, 1933 |